(12) United States Patent
DiSanto

(10) Patent No.: US 8,467,826 B1
(45) Date of Patent: Jun. 18, 2013

(54) REMOTE VEHICLE STARTER SYSTEM

(76) Inventor: Shannon M. DiSanto, Cheektowaga, NY (US)

( * ) Notice: Subject to any disclaimer, the term of this patent is extended or adjusted under 35 U.S.C. 154(b) by 184 days.

(21) Appl. No.: 12/958,960

(22) Filed: Dec. 2, 2010

(51) Int. Cl.
*H04M 1/00* (2006.01)
(52) U.S. Cl.
USPC .................. 455/550.1; 455/41.2; 701/113
(58) Field of Classification Search
USPC ..................................................... 455/550.1
See application file for complete search history.

(56) References Cited

U.S. PATENT DOCUMENTS

| | | | |
|---|---|---|---|
| 4,227,588 A | 10/1980 | Biancardi | |
| D453,148 S | 1/2002 | Alexander et al. | |
| 6,873,824 B2 | 3/2005 | Flick | |
| 6,987,478 B2 | 1/2006 | Kahn | |
| 7,483,783 B2* | 1/2009 | Dery | 701/113 |
| 2005/0082862 A1* | 4/2005 | Anderson et al. | 296/37.7 |
| 2005/0246070 A1 | 11/2005 | Matsuura et al. | |
| 2006/0061458 A1 | 3/2006 | Simon et al. | |
| 2007/0018846 A1 | 1/2007 | Taraian | |
| 2007/0060056 A1* | 3/2007 | Whitaker et al. | 455/41.2 |

* cited by examiner

*Primary Examiner* — Ajibola Akinyemi

(57) ABSTRACT

A system for remotely turning on and off a vehicle's ignition, locking and unlocking a vehicle's doors, and controlling the temperature inside the vehicle. The system features a cellular phone adapted to communicate with a wireless module. The wireless module is installed in the vehicle and is connected to the vehicle's ignition s system, lock system, and temperature control system. By pressing various buttons on the cellular phone's programmed application, a user can manipulate the ignition, doors, and temperature of the vehicle.

1 Claim, 4 Drawing Sheets

REMOTE VEHICLE STARTER SYSTEM

FIELD OF THE INVENTION

The present invention is directed to a system with a wireless receiver module for a vehicle, wherein the system allows a user to start the vehicle from a distance with a cellular telephone.

BACKGROUND OF THE INVENTION

Many individuals wish to start their vehicles before they physically enter the car. For example, during cold weather conditions, it may be beneficial to start the vehicle while the user is still in his/her home, allowing the vehicle to warm up before the user gets into the vehicle. The present invention features a remote vehicle starter system for remotely starting a vehicle. The system features a wireless receiver module for installing in the vehicle. A cellular telephone can activate the receiver module, thereby starting the vehicle.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a remote vehicle starter system. In some embodiments, the system comprises a wireless receiver module comprising a housing for mounting in a vehicle via an attachment means, and a first electrical attachment component, a second electrical attachment component, and a third electrical attachment component each extending from the housing, each attachment component is operatively connected to a microprocessor disposed in the housing, the first electrical attachment component is for operatively connecting to an antenna of the vehicle, the second electrical attachment component is for operatively connecting to an ignition system and a door locking system of the vehicle, and the third electrical attachment component is for operatively connecting to a temperature control system of the vehicle, the first electrical attachment component is operatively connected to a receiver chip, the receiver chip is operatively connected to the microprocessor; and a cellular telephone comprising an application program with (i) an ignition on button; (ii) an ignition off button; (iii) a door lock button; (iv) a door unlock button; (v) a turn up temperature button; and (vi) a turn down temperature button, the receiver chip is adapted to receive a signal from the cellular phone via the antenna of the vehicle.

The cellular phone is adapted to (i) send a first cellular signal to the receiver chip when the ignition on button is pushed, upon receipt of the first cellular signal the receiver chip sends a first cellular input signal to the microprocessor whereupon the microprocessor sends a first output command to the ignition system to activate the ignition; (ii) send a second cellular signal to the receiver chip when the ignition off button is pushed, upon receipt of the second cellular signal the receiver chip sends a second cellular input signal to the microprocessor whereupon the microprocessor sends a second output command to the ignition system to deactivate the ignition; (iii) send a third cellular signal to the receiver chip when the door lock button is pushed, upon receipt of the third cellular signal the receiver chip sends a third cellular input signal to the microprocessor whereupon the microprocessor sends a third output command to the door locking system to lock the doors of the vehicle; (iv) send a fourth cellular signal to the receiver chip when the door unlock button is pushed, upon receipt of the fourth cellular signal the receiver chip sends a fourth cellular input signal to the microprocessor whereupon the microprocessor sends a fourth output command to the door locking system to unlock the doors of the vehicle; (v) send a fifth cellular signal to the receiver chip when the turn up temperature button is pushed, upon receipt of the fifth cellular signal the receiver chip sends a fifth cellular input signal to the microprocessor whereupon the microprocessor sends a fifth output command to the temperature system to cause the temperature system to increase temperature in the vehicle; and (vi) send a sixth cellular signal to the receiver chip when the turn down temperature button is pushed, upon receipt of the sixth cellular signal the receiver chip sends a sixth cellular input signal to the microprocessor whereupon the microprocessor sends a sixth output command to the temperature system to cause the temperature system to decrease temperature in the vehicle.

In some embodiments, the attachment means is a mounting bracket. In some embodiments, the mounting bracket includes a first mounting bracket, a second mounting bracket, a third mounting bracket, and a fourth mounting bracket.

DESCRIPTION OF PREFERRED EMBODIMENTS

Figure 1:
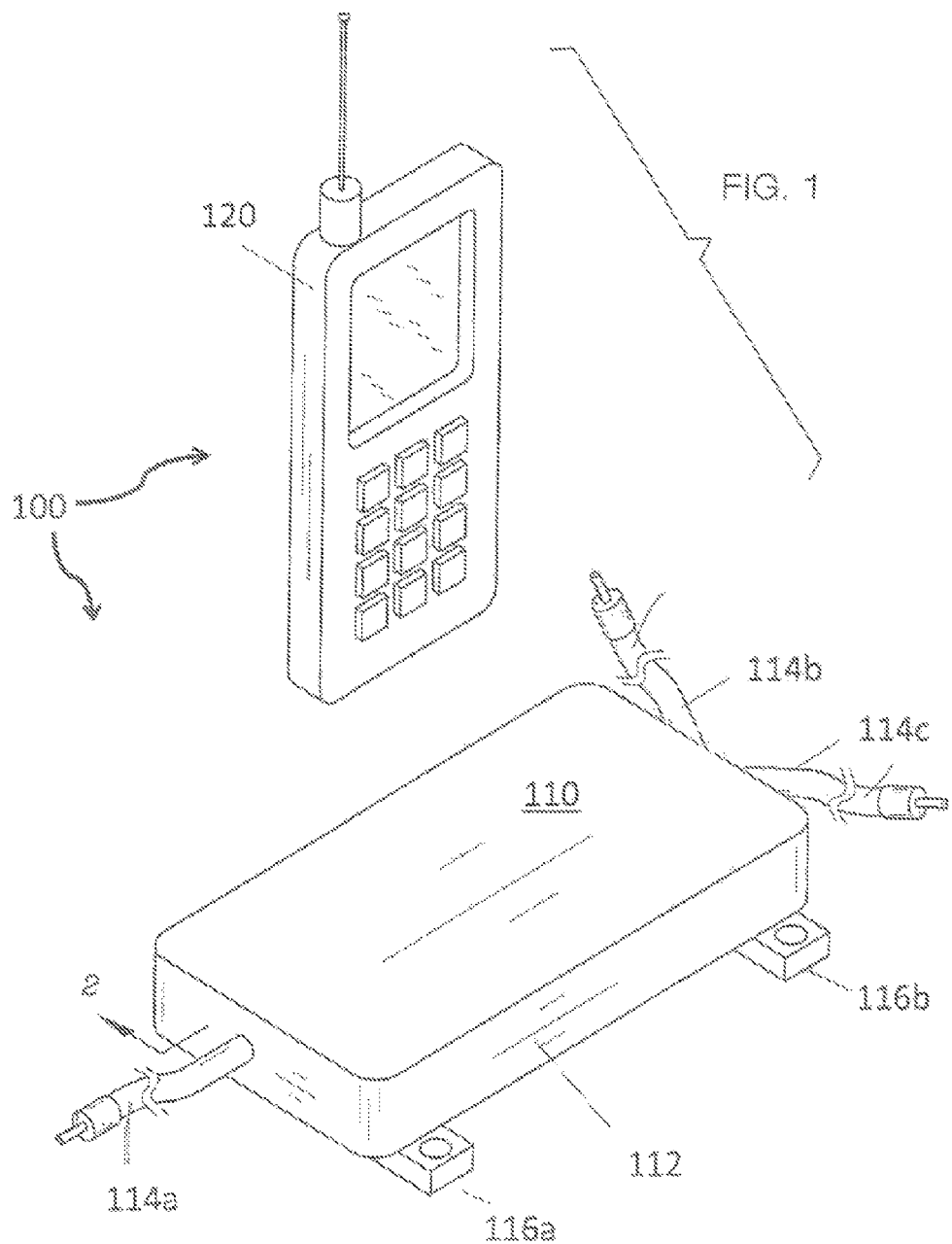
FIG. 1 is a perspective view of the remote vehicle starter system of the preset invention. The wireless receiver module and cellular telephone are shown.
Figure 2:
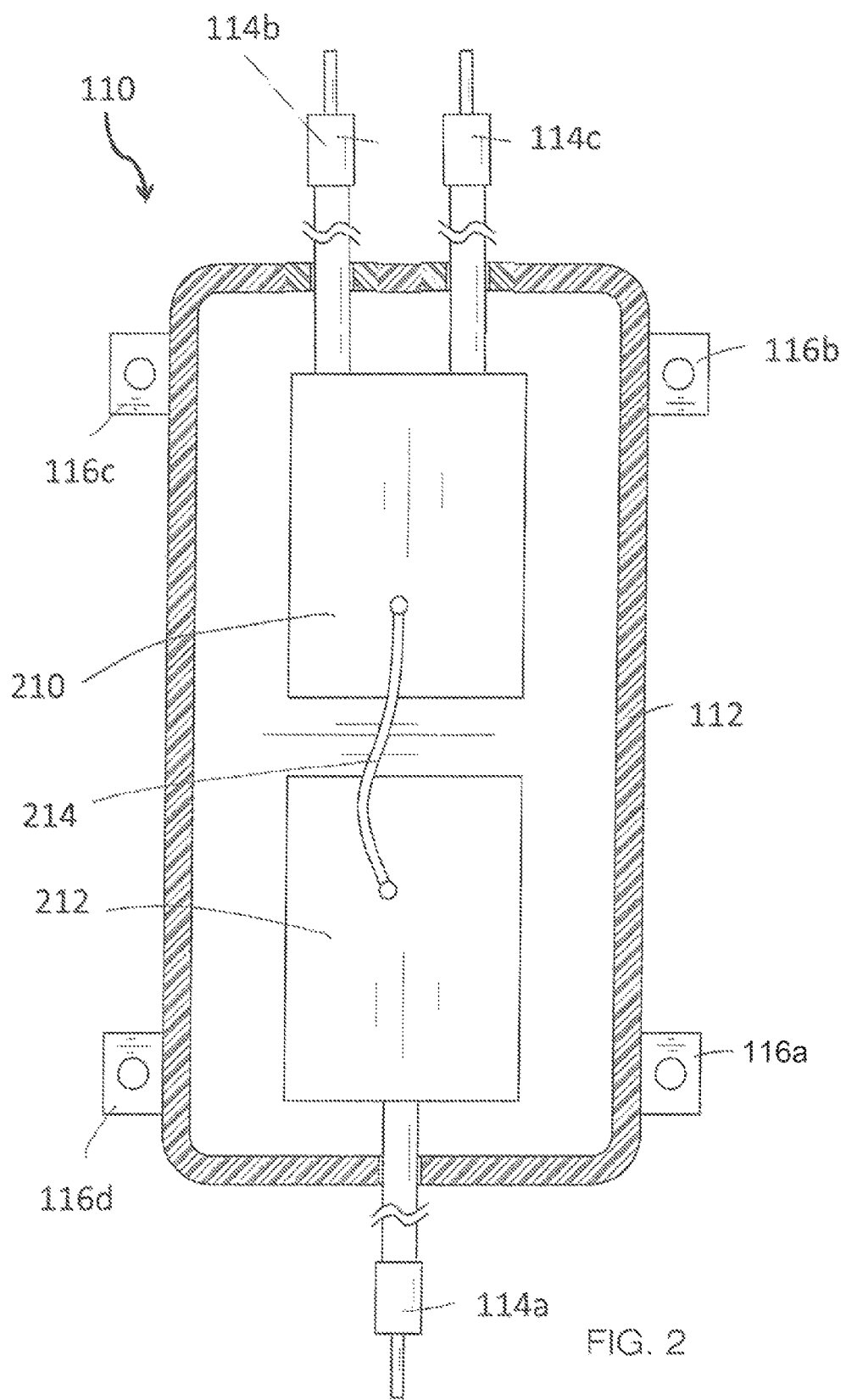
FIG. 2 is a cross sectional view of the wireless receiver module of the remote vehicle starter system of FIG. 1.

Referring now to FIGS. 1-4, the present invention features a remote vehicle starter system 100 for remotely starting a vehicle. The system 100 features a wireless receiver module 110 for installing in the vehicle. A cellular telephone 120 can be used to activate the wireless receiver module 110, thereby starting the vehicle.

The cellular phone 120 may have an application to download from a company, for example from the company selling the system 100 of the present invention (e.g., linked with a phone company). The size of the phone and brand is based on the selling company's choice. The application the user has on the phone has several options. For example, the application may have an option for (a) locking and unlocking the vehicle with starting or shutting off the engine; (b) locking and unlocking the vehicle with starting or shutting off the engine in addition to temperature control options (temperature inside the vehicle); (c) starting and shutting off the engine; the like, or a combination thereof. The present invention is not limited to the aforementioned options for the application on the cellular phone 120.

The wireless receiver module 110 may be constructed in a variety of sizes. For example, in some embodiments, the wireless receiver module 110 is about 8 inches in length and/or 2 inches in thickness. In some embodiments, the wireless receiver module 110 is between about 6 to 8 inches in length. In some embodiments, the wireless receiver module 110 is less than about 6 or more than about 8 inches in length. In some embodiments, the wireless receiver module 110 is between about 0.5 to 3 inches in thickness. In some embodiments, the wireless receiver module 110 is more than about 3 inches in thickness.

A user controls the cellular phone 120 (with the application adapted to control the system 100 of the present invention), for example the cellular phone 120 is adapted to send wireless signals to the module 110. The user can control the signals emitted from the cellular phone 120 to start and shut off the vehicle and/or lock and unlock vehicle. In some embodiments, the user can control the temperature inside the vehicle (once the vehicle is started), for example the user can heat or cool the temperature in the vehicle. The wireless module 110 can be activated miles away via the cellular phone 120. As an example, a tractor trailer driver in his/her home 20 miles away can start (or stop) a truck (and control the temperature). That way by the time the driver gets to he truck it will be at the desired temperature. The driver can unlock it at any time between getting from his/her home to the location of the truck.

Referring now to FIGS. 1-4, the system 100 comprises a wireless receiver module 110. The wireless receiver module 110 comprises a housing 112 for housing electrical circuitry components and wires. The housing 112 can be mounted in a vehicle via an attachment means. In some embodiments, the housing 112 is mounted at or near the dash of the vehicle, below the steering wheel console (e.g., see FIG. 4), etc. the housing 112 can be mounted under the steering column but above the panel that protects the steering column. This may the housing 112 from being seen to help prevent the housing 112 from being stolen. This may also help prevent the driver from hitting the housing 112.

The attachment means may include mounting brackets 116, for example mounting brackets 116 disposed on the housing 112 for securing the housing 112 to the vehicle (e.g., via screws, bolts, etc.). Mounting brackets may include a first mounting bracket 116a, a second mounting bracket 116b, a third mounting bracket 116c, and a fourth mounting bracket 116d. The mounting brackets may be disposed on a first surface of the housing 112, for example around the outer edges of the first surface of the housing 112.

Extending from the housing 112 of the wireless receiver module 110 is a first electrical attachment component 114a, a second electrical attachment component 114b, and a third electrical attachment component 114c. The first electrical attachment component 114a is for operatively connecting to the antenna of the vehicle. The second electrical attachment component 114b is for operatively connecting to the ignition system (and optionally the door locking system) of the vehicle. The third electrical attachment component 114c is for operatively connecting to the temperature control system of the vehicle. Antennas, temperature control systems, and ignition systems are standard parts of vehicles and are well known to one of ordinary skill in the art.

The first electrical attachment component 114a, the second electrical attachment component 114b, and the third electrical attachment component 114c are each operatively connected to a microprocessor 210 disposed in the housing 112 of the wireless receiver module 110. The microprocessor 210 comprises a memory chip. The microprocessor 210 is operatively connected to a receiver chip 212 (e.g., via a wire 214). The first electrical attachment component 114a is operatively connected to the receiver chip 212/antenna.

Figure 3:
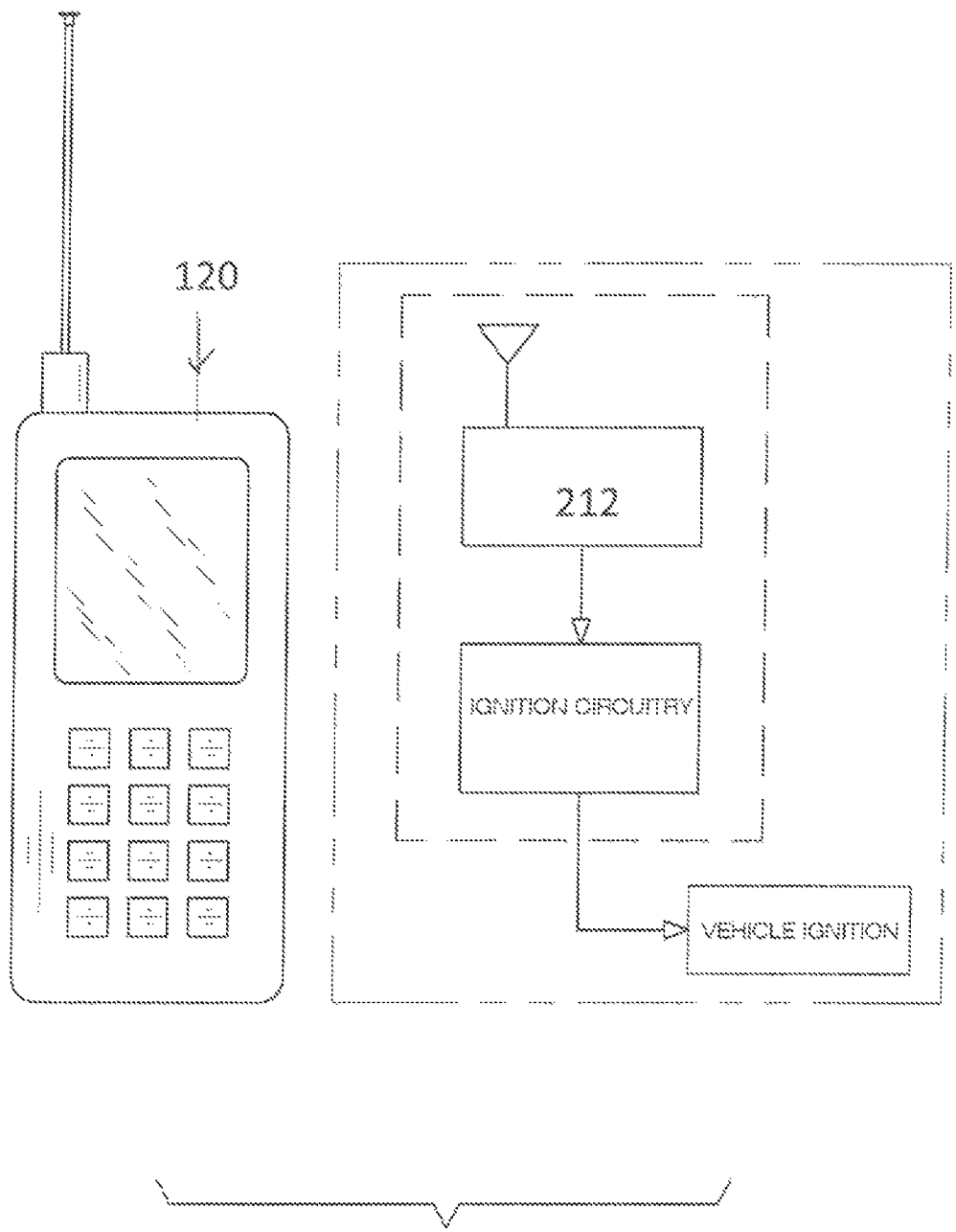
FIG. 3 is a schematic representation of ignition circuitry in the wireless receiver module.
Figure 4:
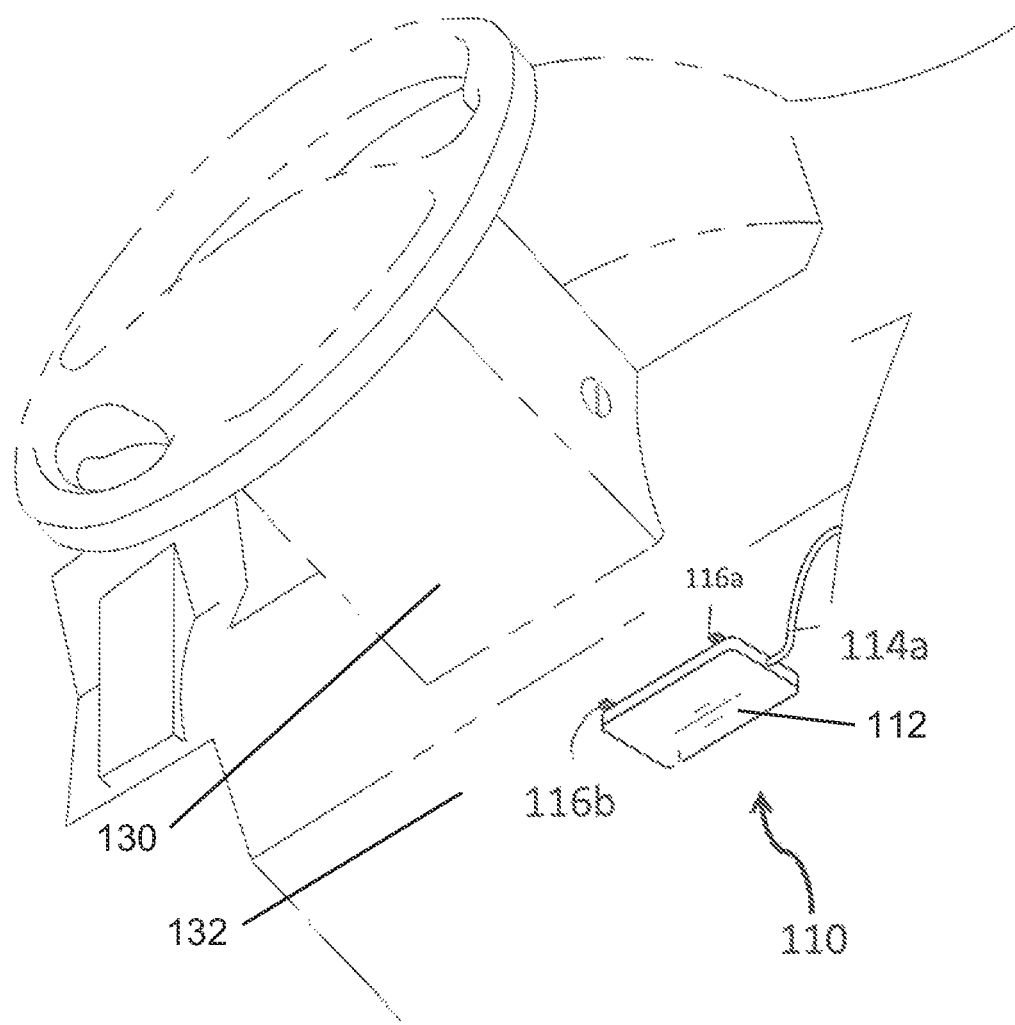
FIG. 4 is an in-use view of the system of the present invention wherein the wireless module is installed in the vehicle on a panel 132 under the steering wheel 130. The present invention is not limited to installation under the steering wheel.

The receiver chip 212 (e.g., via the antenna, for example) is adapted to receive a signal from the cellular phone 120. The cellular phone 120 is adapted to send multiple signals. For example, the cellular phone 120 is adapted to send a first cellular signal to the antenna/receiver chip 212 (e.g., when a user activates the application of the cellular phone 120 in a first manner, e.g., pressing an ignition on button). Upon receipt of the first cellular signal, the antenna/receiver chip 212 sends a first cellular input signal to the microprocessor 210 whereupon the microprocessor sends a first output command to the ignition system (via the second electrical attachment component 114b) to activate the ignition. In some embodiments, the cellular phone 120 is adapted to send a second cellular signal to the antenna/receiver chip 212 (e.g., when a user activates the application of the cellular phone 120 in a second manner, e.g., pressing an ignition off button). Upon receipt of the second cellular signal, the antenna/receiver chip 212 sends a second cellular input signal to the microprocessor 210 whereupon the microprocessor sends a second output command to the ignition system (via the second electrical attachment component 114b) to deactivate (turn off) the ignition. FIG. 3 shows a schematic view of the connection between the receiver chip 212, the ignition circuitry (ignition system), and the ignition of the vehicle.

In some embodiments, the cellular phone 120 is adapted to send a third cellular signal to the antenna/receiver chip 212 (e.g., when a user activates the application of the cellular phone 120 in a third manner, e.g., pressing a door lock button). Upon receipt of the third cellular signal, the antenna/receiver chip 212 sends a third cellular input signal to the microprocessor 210 whereupon the microprocessor sends a third output command to the door locking system (via the second electrical attachment component 114b) to lock the doors of the vehicle. In some embodiments, the cellular phone 120 is adapted, to send a fourth cellular signal to the antenna/receiver chip 212 (e.g., when a user activates the application of the cellular phone 120 in a fourth manner, e.g., pressing a door unlock button). Upon receipt of the fourth cellular signal, the antenna/receiver chip 212 sends a fourth cellular input signal to the microprocessor 210 whereupon the microprocessor sends a fourth output command to the door locking system (via the second electrical attachment component 114b) to unlock the doors of the vehicle.

In some embodiments, the cellular phone 120 is adapted to send a fifth cellular signal to the antenna/receiver chip 212 (e.g., when a user activates the application of the cellular phone 120 in a fifth manner, e.g., pressing a turn up temperature button). Upon receipt of the fifth cellular signal, the antenna/receiver chip 212 sends a fifth cellular input signal to the microprocessor 210 whereupon the microprocessor sends a fifth output command to the temperature system (via the third electrical attachment component 114c) to cause the temperature system to increase the temperature in the vehicle. In some embodiments, the cellular phone 120 is adapted to send a sixth cellular signal to the antenna/receiver chip 212 (e.g., when a user activates the application of the cellular phone 120 in a sixth manner, e.g., pressing a turn down temperature button). Upon receipt of the sixth cellular signal, the antenna/receiver chip 212 sends a sixth cellular input signal to the microprocessor 210 whereupon the microprocessor sends a sixth output command to the temperature system (via the third electrical attachment component 114c) to cause the temperature system to decrease the temperature in the vehicle.

As used herein, the term "about" refers to plus or minus 10% of the referenced number. For example, an embodiment wherein the wireless receiver module 110 is about 8 inches in length includes a module 110 that is between 7.2 and 8.8 inches in length.

The disclosures of the following U.S. Patents are incorporated in their entirety by reference herein: U.S. Pat. Application No. 2007/0018846; U.S. Pat. Application No. 2006/0061458; U.S. Pat. No. 6,873,824; U.S. Pat. Application No. 2005/0246070; U.S. Pat. No. 4,227,588; U.S. Pat. No. 6,987,478; U.S. Design Pat. No. D453,148.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A remote vehicle starter system consisting of:
   (a) a wireless receiver module (110) comprising a housing (112) for mounting in a vehicle on a panel (132) under a steering wheel (130) via a mounting bracket (116) having a first mounting bracket (116a), a second mounting bracket (116b), a third mounting bracket (116c), and a fourth mounting bracket (116d), and a first electrical attachment component (114a), a second electrical attachment component (114b), and a third electrical attachment component (114c) each extending from the housing (112), each attachment component (114) is operatively connected to a microprocessor (210) disposed in the housing (112), the first electrical attachment component (114a) is for operatively connecting to an antenna of the vehicle, the second electrical attachment component (114b) is for operatively connecting to an ignition system and a door locking system of the vehicle, and the third electrical attachment component (114c) is for operatively connecting to a temperature control system of the vehicle, the first electrical attachment component (114a) is operatively connected to a receiver chip (212), the receiver chip (212) is operatively connected to the microprocessor (210);
   (b) a cellular telephone (120) comprising an application program with (i) an ignition on button; (ii) an ignition off button; (iii) a door lock button; (iv) a door unlock button; (v) a turn up temperature button; and (vi) a turn down temperature button, the receiver chip (212) is adapted to receive a signal from the cellular phone (120) via the antenna of the vehicle;
wherein the cellular phone (120) is adapted to (i) send a first cellular signal to the receiver chip (212) when the ignition on button is pushed, upon receipt of the first cellular signal the receiver chip (212) sends a first cellular input signal to the microprocessor (210) whereupon the microprocessor (210) sends a first output command to the ignition system to activate the ignition; (ii) send a second cellular signal to the receiver chip (212) when the ignition off button is pushed, upon receipt of the second cellular signal the receiver chip (212) sends a second cellular input signal to the microprocessor (210) whereupon the microprocessor (210) sends a second output command to the ignition system to deactivate the ignition; (iii) send a third cellular signal to the receiver chip (212) when the door lock button is pushed, upon receipt of the third cellular signal the receiver chip (212) sends a third cellular input signal to the microprocessor (210) whereupon the microprocessor (210) sends a third output command to the door locking system to lock the doors of the vehicle; (iv) send a fourth cellular signal to the receiver chip (212) when the door unlock button is pushed, upon receipt of the fourth cellular signal the receiver chip (212) sends a fourth cellular input signal to the microprocessor (210) whereupon the microprocessor (210) sends a fourth output command to the door locking system to unlock the doors of the vehicle; (v) send a fifth cellular signal to the receiver chip (212) when the turn up temperature button is pushed, upon receipt of the fifth cellular signal the receiver chip (212) sends a fifth cellular input signal to the microprocessor (210) whereupon the microprocessor (210) sends a fifth output command to the temperature system to cause the temperature system to increase temperature in the vehicle; and (vi) send a sixth cellular signal to the receiver chip (212) when the turn down temperature button is pushed, upon receipt of the sixth cellular signal the receiver chip (212) sends a sixth cellular input signal to the microprocessor (201) whereupon the microprocessor (210) sends a sixth output command to the temperature system to cause the temperature system to decrease temperature in the vehicle.

* * * * *